United States Patent [19]
Redford

[11] Patent Number: 5,295,365
[45] Date of Patent: Mar. 22, 1994

[54] INVERTIBLE COOLER

[76] Inventor: Thomas A. Redford, 139 Munro Crescent, Uxbridge, Ontario, Canada, L9P 1L6

[21] Appl. No.: 967,024

[22] Filed: Oct. 27, 1992

[51] Int. Cl.$^5$ .............................................. F25D 3/08
[52] U.S. Cl. ...................................... 62/265; 62/371; 62/457.1; 62/457.7; 62/464
[58] Field of Search ............... 62/265, 371, 457.1, 62/457.7, 464, 331; 312/236, 283, 284, 285, 286

[56] References Cited

U.S. PATENT DOCUMENTS

| | | | |
|---|---|---|---|
| 1,489,668 | 4/1924 | Hathaway | |
| 2,570,300 | 10/1951 | Acton | 62/457.7 |
| 3,057,508 | 10/1962 | Kimbrough, Jr. | 62/457.5 X |
| 3,237,801 | 3/1966 | Cummings | 62/457.1 |
| 3,402,569 | 9/1968 | Myers | 62/371 X |
| 3,703,816 | 11/1972 | Weathers | 62/371 X |
| 3,810,367 | 5/1974 | Peterson | 62/371 X |
| 4,322,954 | 4/1982 | Sheehan et al. | 62/371 |
| 4,351,165 | 9/1982 | Gottsegen et al. | 62/371 |
| 4,537,044 | 8/1985 | Putnam | 62/457.7 X |
| 4,566,292 | 1/1986 | Parmet | 62/457.1 |
| 4,724,681 | 2/1988 | Bartholomew et al. | 62/457.7 X |

Primary Examiner—Henry A. Bennett
Assistant Examiner—Christopher B. Kilner

[57] ABSTRACT

A container intended to act as a cooler for items such as beverage cans or bottles has an insulated body with watertight closures at each end each capable of acting either as a base of the cooler or a lid. Fastenings to secure the closures, and supports for the cooler are also provided; their functions may be integrated. The supports may be carrying handles, or stands forming a support on which the cooler may be inverted. The ability to invert the cooler enables the functions of adding ice and adding or removing articles to be cooled to be conveniently separated.

10 Claims, 5 Drawing Sheets

INVERTIBLE COOLER

BACKGROUND OF THE INVENTION

1. Field of the Invention

This invention relates to insulated containers used to transport food or beverages, and commonly known as "coolers".

2. Review of the Art

Such coolers typically consist of a body of rectangular or cylindrical form, having inner and outer side and bottom walls separated by an insulating material such as synthetic plastic foam, a hinged or removable lid, also having inner and outer walls separated by insulation, a carrying handle attached to the body, and some means for securing the lid in a closed position, which means may be integrated with the carrying handle. As a cooling medium, ice is commonly used, placed within the cooler together with the contents. A normally closed drain may be provided in the side of the body adjacent its bottom to drain off water formed by melting of the ice.

The ice is most effective as a cooling agent when placed over or around articles, for example beverage bottles or cans, to be cooled, and is certainly most easily replenished by placing it in the top of the cooler. Such an arrangement is however less satisfactory when removing bottles, cans or food containers, since it is necessary to fish for a wanted bottle, can or container beneath the ice or a mixture of ice and water.

SUMMARY OF THE INVENTION

It is an object of the present invention to provide a cooler in which ice may be readily added or replenished, and located over articles to be cooled, without prejudicing ease of access to those articles.

According to the invention, a cooler has a generally tubular body, the body having inner and outer side walls, and a layer of thermal insulation between said inner and outer side walls, end closures with inner and outer closure walls and a layer of insulation between said closure walls, a peripheral sealing component at each end of the tubular body engageable with a peripheral sealing component on said closures to form a watertight seal, carrier means connected to the body to support the latter with either end closure upward, and means to secure said closures with their peripheral sealing component in sealing engagement with the sealing component on the body, each closure being configured to act either as a base or a lid of the cooler according to whether the end of the body to which it is applied is downward or upward.

With such an arrangement, whichever closure is at the top of the cooler may be removed or hinged open, and articles to be cooled may be placed in the cooler and covered with ice. Alternatively ice may be placed first in the cooler, and articles to be cooled may be placed on top of the ice, and the cooler then closed and inverted. When it is desired to remove articles from the cooler, the entire assembly is inverted, after ensuring that the closure previously at the top is secured so as to close that end of the body, whereupon the closure previously at the bottom, and now at the top, can be opened to access the articles. During such access the ice, and any melted ice water, will be at the bottom of the cooler beneath the articles. When access is no longer required, the cooler may again be inverted to bring the ice once again above the articles and promote efficient cooling, as well as allowing the addition of further ice as required by removal of the then uppermost closure.

While double ended containers of various types are already known, none to my knowledge provides the features set out above necessary to provide a cooler which can function as described.

SHORT DESCRIPTION OF THE DRAWINGS

DESCRIPTION OF THE PREFERRED EMBODIMENTS

Figure 1:
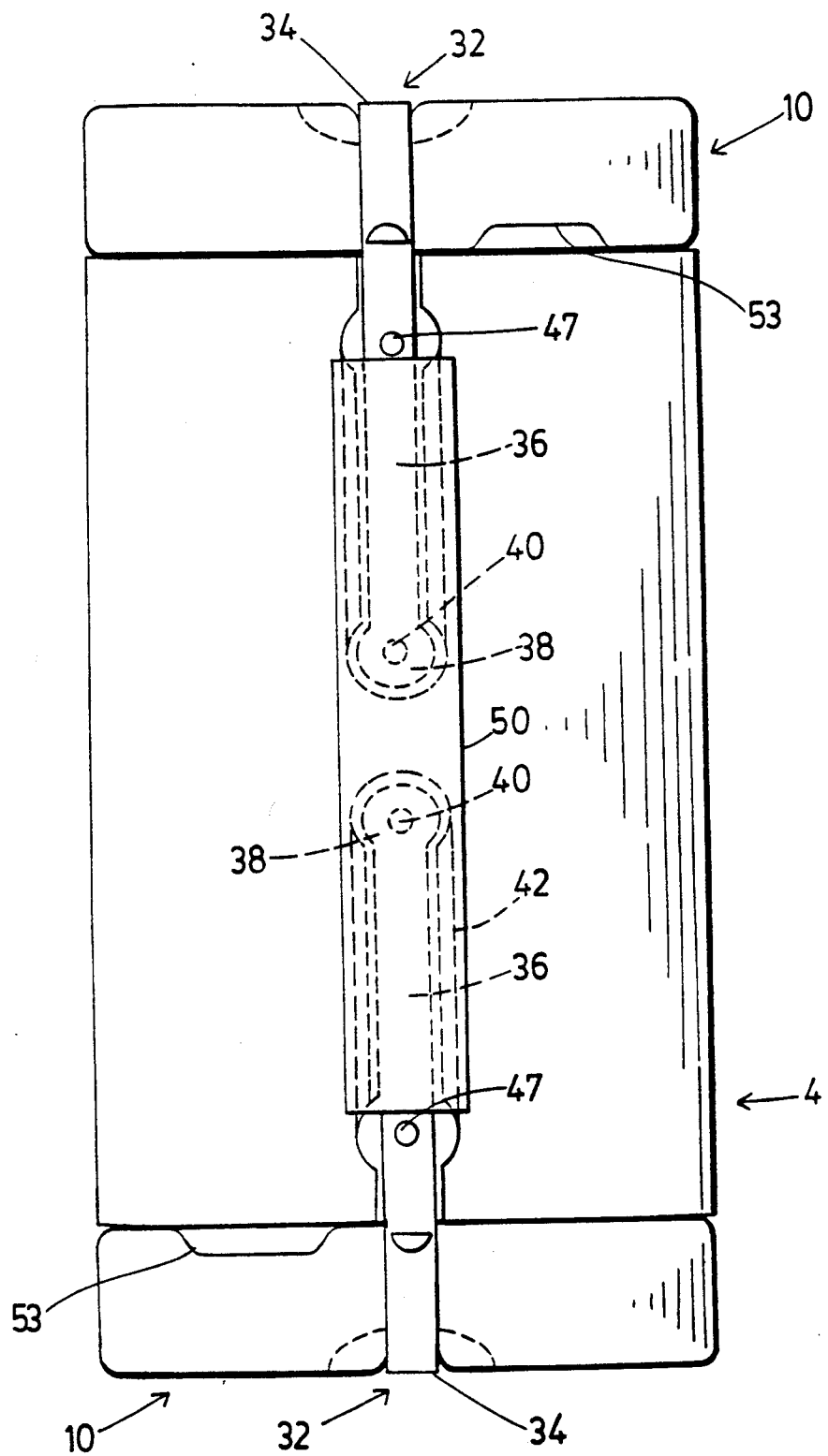
FIG. 1 is a side elevation of a first embodiment of cooler in accordance with the invention.
Figure 2:
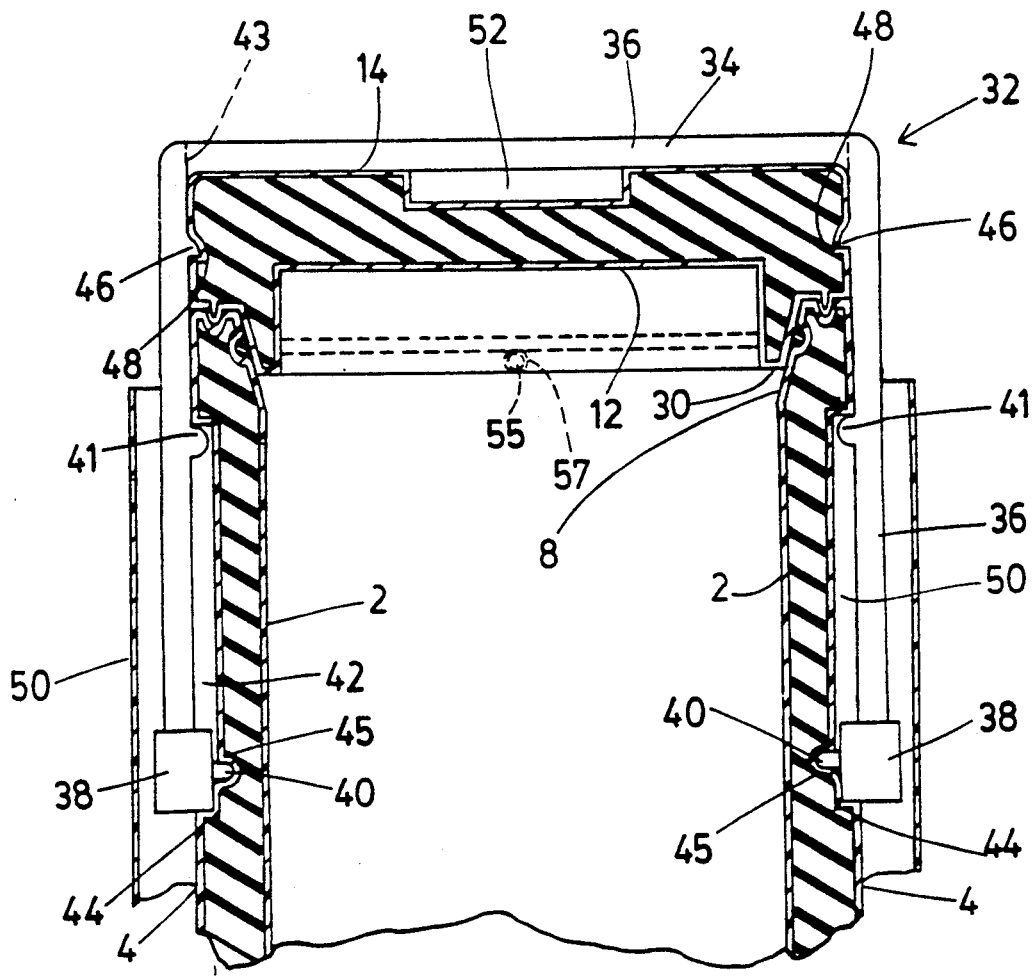
FIG. 2 is a partial vertical section through the cooler of FIG. 1.
Figure 3:
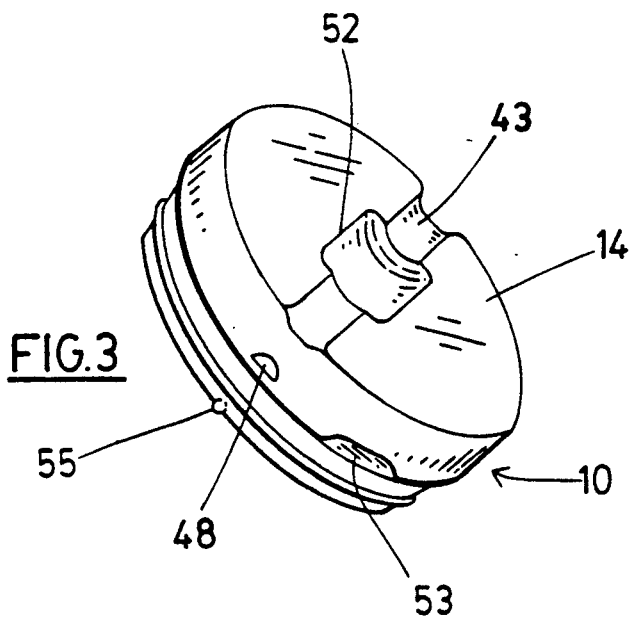
FIG. 3 is a perspective view of a closure of the cooler of FIG. 1.
Figure 4:
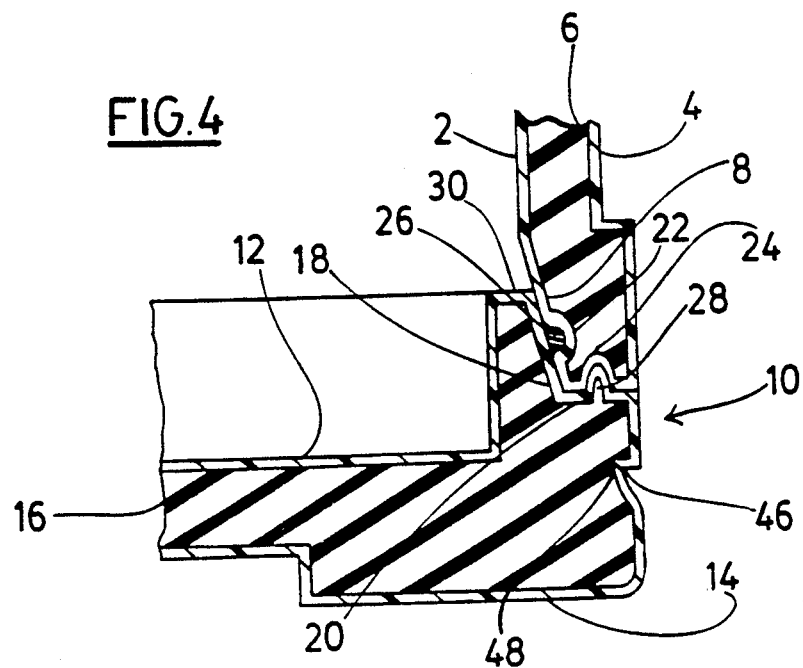
FIG. 4 is a fragmentary section through mating portions of a closure and the body of the cooler of FIG. 1.

Referring to FIGS. 1 to 4, a cooler has a generally rectangular or cylindrical tubular body (a cylindrical body is shown), formed by inner and outer walls 2 (see FIG. 4) and 4, typically of moulded plastic, enclosing a foamed plastic insulating core 6. The walls 2 and 4 are joined at the ends of the body by connecting wall portions 8 (see FIG. 4) described in more detail below. The ends of the body are normally closed by identical removable closures 10 also having inner and outer walls 12 (see FIG. 4) and 14, enclosing an insulating core 16, and connecting wall portions 18 (see FIG. 4) and 20 described in more detail below. The closures are configured so that each may serve either as a removable lid for the cooler, or a supporting base. It is of course important that when a closure is acting as a base of the cooler, it forms a watertight seal with the body, and accordingly the wall portions 8 and 18 are equipped to enter sealing engagement and thus provide a watertight barrier.

With this end in view, the wall portions 8 of the body are configured to provide an upstanding (assuming the closure is acting as a base) lip engaging a skirt 30 defined by the walls 12 and 18 of the closure. The lip defines grooves 22 and 24 on its inside and end surfaces, the groove 22 housing a continuous elastomeric sealing member 26. The lip also engages the skirt 30, and a rib 28 on the horizontal surface of the wall 20 engages the groove 24, whilst the wall 18 engages the sealing member 26 and the inner wall of the lip. In consequence, the engagement of the rib 28 with the groove 24 supports the walls of the body against distortion caused by the pressure of contents of the cooler or by warping, while the skirt 30 engaging the wall 8 restrains the body against inward distortion, thus ensuring maintenance of a watertight seal by the sealing member 26. Provided that too much water does not accumulate within the cooler, additional assurance against leakage is provided by the skirt 30 which forms a dam around the base.

In the embodiment of FIGS. 1 to 4, the end closures 10 are locked in place by pull-out carrying handles 32. The handles 32 each have a cross bar 34 and stems 36, terminating in enlarged bosses 38 with central inwardly directed nipples 40. The walls 4 are formed with vertical channels 42 to accommodate the nipples 40, with enlarged circular recesses 44 at inward ends of the channels to provide alternative accommodations for the bosses 38. The recesses 44 have central tapered bores 45 to receive the nipples 40. Each closure 10 has a diametric groove 43 in its outer wall 14 to accommodate the cross bar 36 of a handle. Indented tongues 46 on the stems 36 latch into recesses 48 in the wall 20 and coact with the bosses 38 engaging the recesses 44 and further to lock the closure to the body. A central recess 52 in the wall 14 provides clearance for a user to grip and force the cross bar 34 away from that closure 10 when it is at the top of the cooler. The force pulls the wedge shaped surfaces of the tongues 46 clear of the recesses 44, which in turn forces the stems 36 outwardly so that the nipples 40 disengage from the bores 45 and enter the channels 42 and the bosses 38 disengage from the recesses 44, and further nipples 41 disengage from the tops of grooves 42 permitting the cross bar 34 to be drawn upwardly until the tongues 46 clear the closure, and the nipples 40 engage the tops of the grooves 42 so that the handle may be pivoted about the bosses 38 and nipples 40 into a position clear of the closure, permitting that closure, currently forming the lid of the cooler, to be removed with the assistance of recesses 53 formed at the bottom edge of the lids.

To ensure replacement of the closure in the correct orientation, a small spigot 55 (see FIG. 3) is formed on an outside edge of the skirt 30 which engages a notch 57 (see FIG. 2) in the lip of the body. After replacement of the closure, the handle 32 may be moved to a vertical position and pushed downwardly, causing the nipples 40 to move down the grooves 42 into the bores 45, the nipples 41 to engage the tops of grooves 42, and the tongues 46 to enter the recesses 48, so that the handle returns to its original position locking the lid in place. The cooler may then be safely inverted and stood on that closure 10, in which condition that handle 32 is retained in a position locking what is now the base of the cooler.

A shroud 50 on either side of the body forms a tunnel enclosing the stems 36 of the handles 32, improving appearance and reducing the risk of accidental opening.

Figure 5:
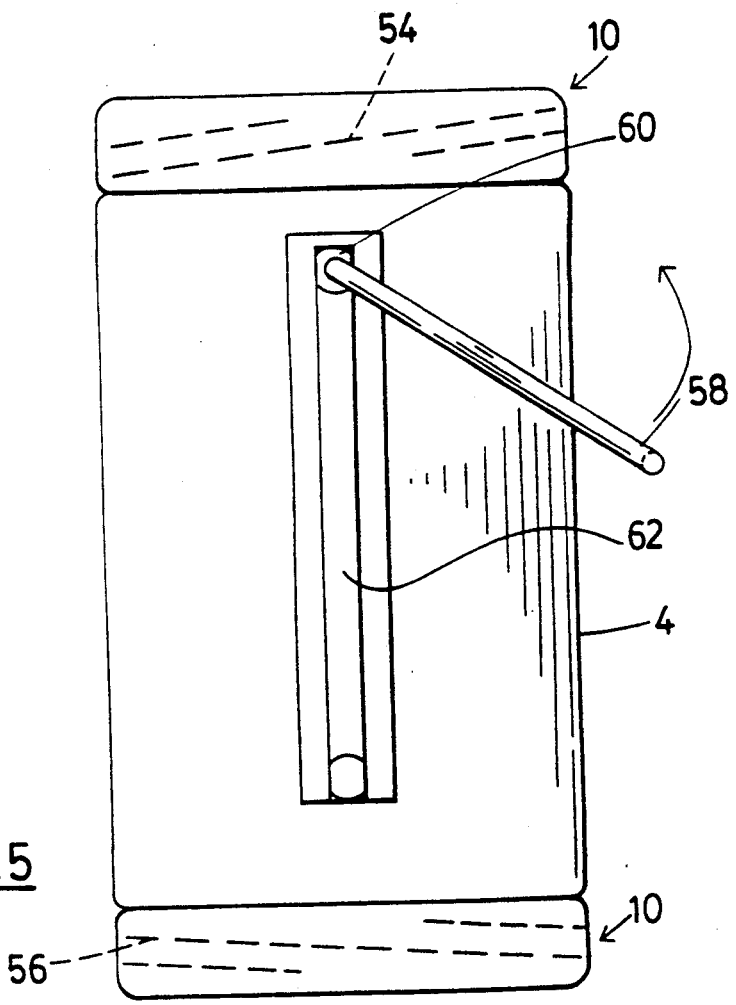
FIG. 5 is an elevation of a second embodiment of cooler.
Figure 6:
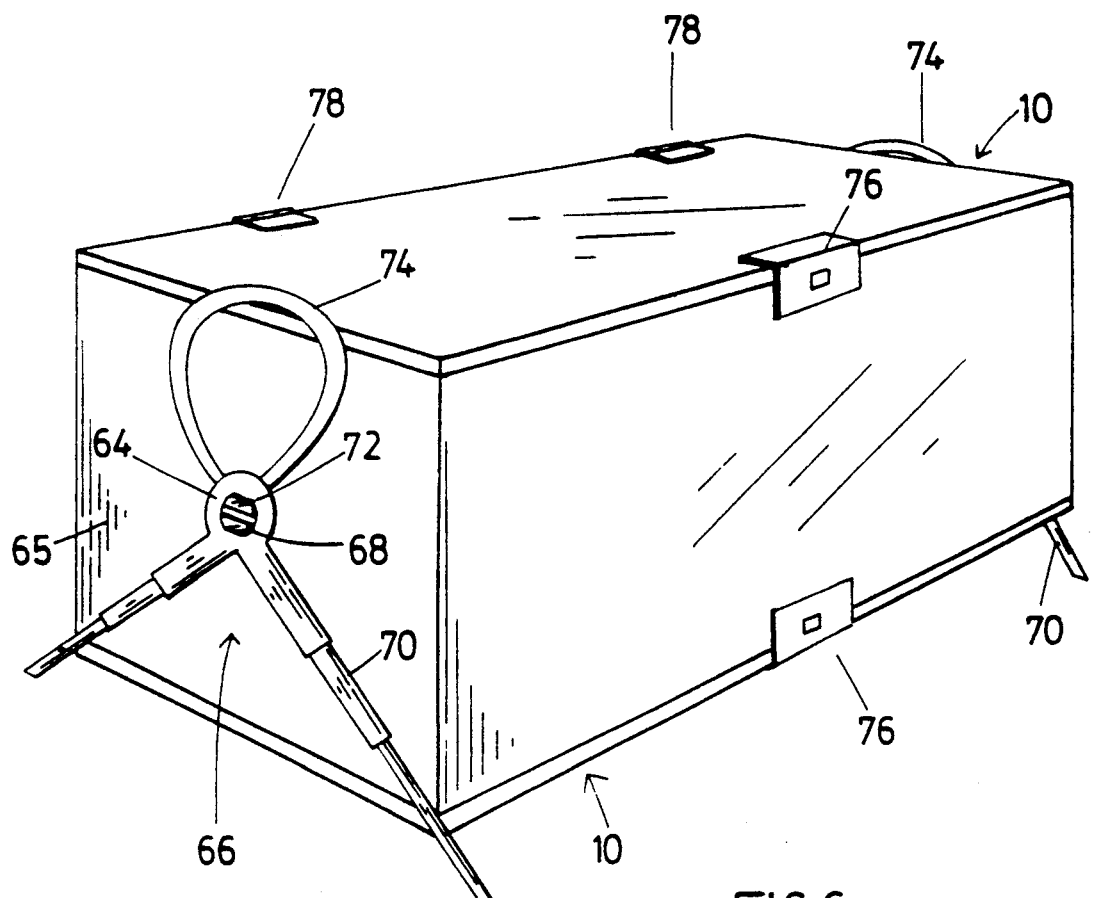
FIG. 6 is a perspective view of a third embodiment of cooler.

In a modified version of the cooler shown in FIG. 5, the body is cylindrical and the inside walls of the closures 10 and the ends of the body are provided with complementary screw threads 54,56 to look the closure in place. A single handle 58 is provided with pivots 60 sliding in tracks 62 so that the handle may be moved between opposite ends of the cooler.

The weight of a large cooler filled with beverage containers and ice will be large enough to require considerable strength to invert it bodily. In order to overcome this problem, such a cooler may be provided with trunnions 64 in the centre of each end wall 65 of the body, by which it may be supported on stands 66 for rotation about a horizontal axis passing through the centre of the cooler. Since the centre of gravity of the cooler will tend to alter as the cooler is inverted and the contents respond to effect of gravity, it should remain stable either way up, but to enhance stability, flats 68 may be formed on the trunnions and on the supporting surfaces of the stands. The legs 70 of the stands may be telescopic as shown, and the stands themselves may be removable by squeezing together slotted outer ends 72 of the trunnions. The stands may also incorporate upwardly projecting carrying handles 74 for the cooler. In this embodiment the closures 10 forming the lid and base of the cooler are attached to the body by hinges 78 and secured by locks 76. The closures 10 may be provided with drain cocks (not shown).

Figure 7:
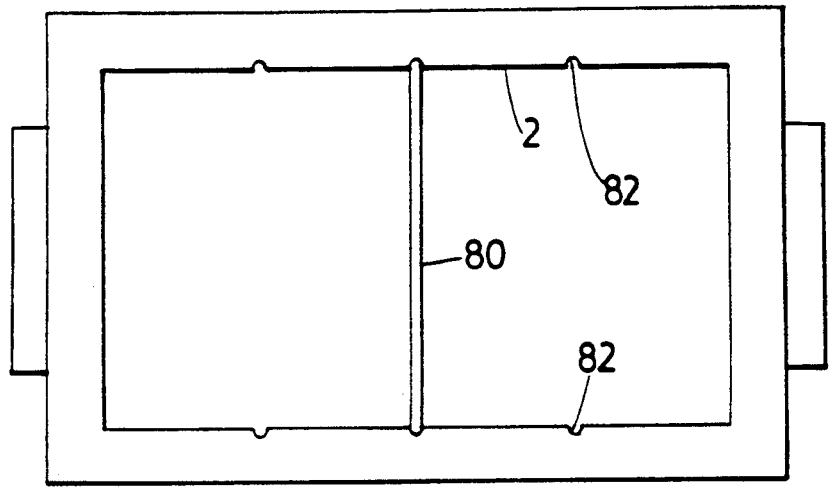
FIG. 7 is a plan view of cooler according to the invention with a closure removed to show an internal partition.
Figure 8:
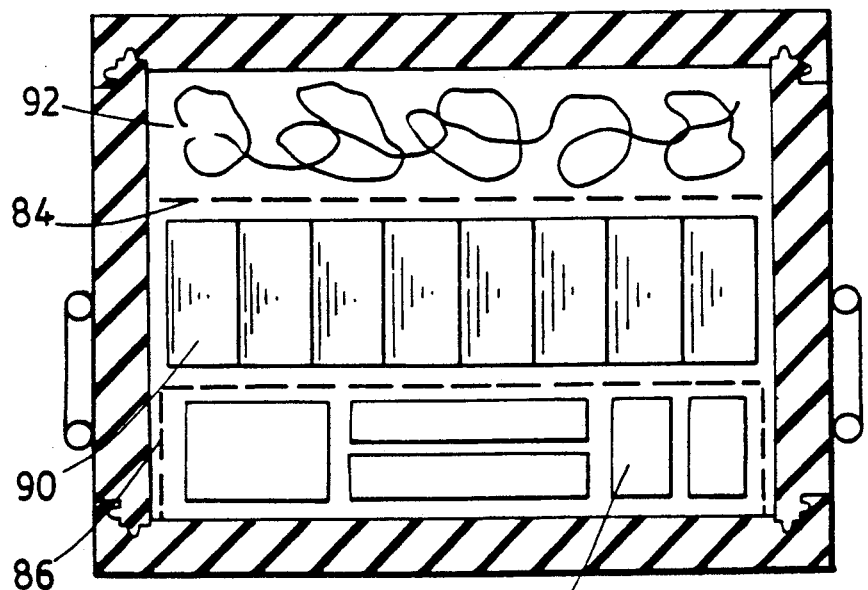
FIG. 8 is a vertical section through a cooler according to the invention, showing internal partitions.

In all embodiments of the invention, the ability to invert the cooler enable the functions of adding ice as a coolant, or adding or removing articles to be cooled, such as beverage cans or bottles, to be conveniently separated. A further advantage of this separation of functions is that it becomes much more practical to subdivide the available space for storing different articles, since the alternative access available to the cooler enables different zones within the cooler to be segregated from each other without impeding access. Thus as shown in FIG. 7, dividers such as divider 80 may be provided which slot into grooves 82 in the inner wall 2 of the body. Alternatively or additionally, wire mesh dividers 84 or lift-out baskets 86 may be conveniently used to segregate, for example, food packages 88, beverage cans 90, and ice 92.

Various modifications are possible within the scope of the invention; the cooler may be of various different shapes. Certain shapes may aid inversion of the cooler, for example the body could be of a generally horizontal cylindrical form except for flat closures on opposite sides of the cylinder; such a shape would enable the cooler to be inverted by rolling it between its alternative positions. Alternative handle and securing arrangements may also be utilized, as may alternative arrangements for securing a watertight seal between the closures and the body.

I claim:

1. A portable cooler for food and beverage articles to be cooled, having a generally tubular open ended body defining a chamber extending from end to end within the cooler for the reception in sequence of both ice and articles to be cooled, said chamber providing a continuous passage for ice water from end to end within the cooler, the body having inner and outer side walls, and a layer of thermal insulation between said inner and outer side walls, closures for the chamber with inner and outer closure walls and a layer of insulation between said closure walls, peripheral sealing components at each end of the tubular body engageable with peripheral sealing components on said closures to form a watertight seal, carrier means connected to the body to support the latter with either end closure upward, and means to secure said closures with their peripheral sealing components in sealing engagement with the sealing components on the body, each closure being configured to act either as a base retaining ice, ice water and articles to be cooled within the body or as a lid of the cooler according to whether the end of the body to which it is applied is downward or upward, the cooler being convertible, by inversion to place a different end of the body downward, between a cooling mode in which ice overlays articles to be cooled and ice water drained from the ice, and an access mode in which the articles overlay the ice and ice water.

2. A cooler according to claim 1, wherein the carrier means connected to the body are integrated with the means to secure the closures.

3. A cooler according to claim 2, wherein the carrier means and securing means comprise a handle at each end of the body, with a cross bar receivable in a recess spanning the closure at that end and side members having detents engageable with opposite sides of the body and with the closure to secure the closure to the body, the cross bar being withdrawable from the recess to disengage the side members from the detents and withdraw them into a position in which the closure is released and the side members are in pivotal engagement with said opposite sides of the body.

4. A cooler according to claim 1, wherein the closures are screw caps.

5. A cooler according to claim 1, wherein a closure acting as a base of the cooler provides a stand for the cooler.

6. A cooler having a generally tubular body, the body having inner and outer side walls, and a layer of thermal insulation between said inner and outer side walls, end closures with inner and outer closure walls and a layer of insulation between said closure walls, peripheral sealing components at each end of the tubular body engageable with peripheral sealing components on said closures to form a watertight seal, carrier means connected to the body to support the latter with either end closure upward, and means to secure said closures with their peripheral sealing components in sealing engagement with the sealing components on the body, each closure being configured to act either as a base or a lid of the cooler according to whether the end of the body to which it is applied is downward or upward, wherein the carrier means are stands for the cooler and the body of the cooler is supported on the stand for rotation about a horizontal pivotal axis so as to permit either closure to be located at the top of the cooler.

7. A cooler according to claim 6, wherein the stands are collapsible.

8. A cooler according to claim 1, including removable internal partitions extending endways within the body.

9. A cooler according to claim 1, including a removable mesh divider extending laterally within the body.

10. A method of using a cooler, having a body with insulated side walls defining an open ended chamber, watertight insulated closures at each end of the chamber, and means for supporting the cooler with either closure uppermost, comprising filling the cooler by supporting the cooler with one end uppermost, removing the closure at that end, sequentially placing articles to be cooled and ice within the body in either order, replacing the closure at that end, inverting the cooler if necessary to bring the ice above the articles, and thereafter accessing the articles by inverting the cooler to relocate the articles above the ice and drain ice water from them, prior to removing the closure at the other end.

* * * * *